April 26, 1960  F. R. FEGAN  2,934,684

RECTIFIER STACK AND SPACING CONTACT WASHER THEREFOR

Filed Jan. 27, 1958

INVENTOR
FRANK R. FEGAN
BY
ATTORNEY

United States Patent Office 2,934,684
Patented Apr. 26, 1960

2,934,684

RECTIFIER STACK AND SPACING CONTACT WASHER THEREFOR

Frank Ronald Fegan, Newark, N.J., assignor to International Telephone and Telegraph Corporation, New York, N.Y., a corporation of Maryland Application January 27, 1958, Serial No. 711,333

4 Claims. (Cl. 317—234)

This invention relates to rectifier assemblies and to spacing washers by means of which the rectifier contact plates are interconnected and spaced when stacked one above the other on a central supporting stud or spindle.

It is well known to assemble a plurality of rectifier plates in a stack with the plates electrically interconnected and physically separated by spacers in order to permit the free passage of air over the surface of the plates to prevent overheating of the rectifier stack when in use. It is also common to make such rectifier stacks of disc-shaped rectifier plates which are mounted upon a central supporting stud or spindle and separated by spacing contact washers which may be in the shape of spools. When the rectifier plates are properly positioned on the central stud with suitable insulating sleeves and washers for insulating the plates from the stud, a predetermined pressure to assume good electrical contact may then be applied to the whole assembly by means of nuts threaded on the central supporting stud.

In manufacturing rectifiers of this nature, one of the problems encountered arises from a tendency for the rectfier plates to move, twist, or otherwise become misaligned with respect to the spacing washers when the stack is tightened. This twisting often damages the counter electrode giving rise to faults in the operation of the rectifiers, so that a fairly large percentage of the completed rectifiers must be scrapped or taken apart and rebuilt. Various schemes have been tried to prevent this relative movement, one of which has been to sandblast or roughen the surface of the washer where it comes in contact with the counter-electrode coating material on the rectifier plate. The effect of sandblasting or roughening however, has not proved to be entirely helpful in eliminating this problem.

One of the objects of the invention is to provide a rectifier stack in which the above-mentioned relative movement between the spacing washers and the rectifier plates is either entirely prevented or limited to such an extent that the rectifiers may be assembled with substantially no rejects.

Another object of the invention is to provide a rectifier stack structure which will take advantage of the cold flowing properties of cadmium alloy counter-electrode material to form a locking, wedging, shear resisting, or clutching action between or at the surfaces of the rectifier plates and separating washers of the stack.

With these objects in view a feature of the invention provides a spacing washer for a rectifier stack in which the surface of the washer which comes in contact with the counter-electrode material of the rectifier plate is provided with a plurality of discontinuities forming edges which are at an angle to possible paths of relative movement between the washer and the adjacent rectifier plate or one in which at least one surface of the spacing washer is provided with a plurality of small depressions which form the edge referred to above.

The above-mentioned and other features and objects of this invention and the manner of attaining them will become more apparent and the invention itself will be best understood by reference to the following description of embodiments of the invention taken in conjunction with the accompanying drawings in which.

Broadly, the invention comprises a rectifier stack having a plurality of rectifier plates mounted concentrically on a stud with suitable insulating sleeves and washers for insulating the rectifier plates from the stud, for separating but electrically connecting the plates, the plates and washers being compressed together by means of nuts having threaded relation with the ends of the stud, the spacing washers having surfaces provided with a plurality of discontinuities forming edges which are at an angle to the possible paths of relative movement between said washers and plates.

Figure 1:
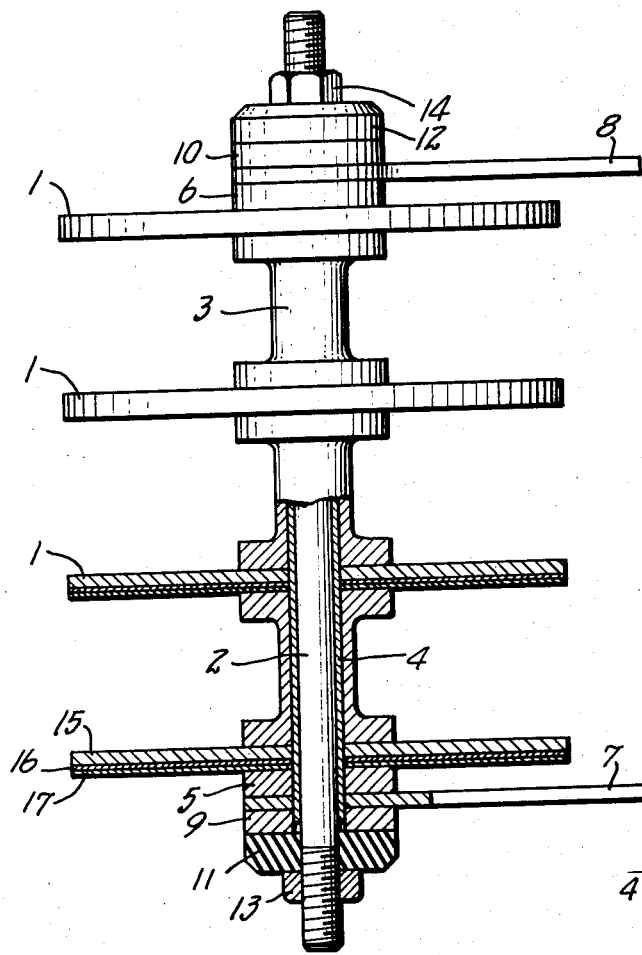
Fig. 1 is a side-elevational view partly in section of a rectifier stack embodying the invention.

Referring now to the drawings, in Fig. 1 a rectifier stack is shown comprising a plurality of rectifier plates 1 mounted on a stud or spindle 2 and supported by the spacing washers 3, which, for purposes of illustration, have been shown in the shape of spools. The stud 2 is indicated as made of metal and the rectifier plates 1 are insulated from the metal stud by means of a sleeve 4 of insulating material which surrounds the stud 2 and extends beyond the outermost rectifier plates of the stack. Metal washers 5 and 6, on the outer sides of the outermost rectifier plates are in contact with these plates. Connecting lugs 7 and 8 may be provided with portions fitting over the spindle 2 and are positioned respectively in contact with the washers 5 and 6 and may be held in the rectifier assembly by additional metal washers 9 and 10. These washers are in turn held by insulating washers 11 and 12 secured by the nuts 13 and 14. The assembly of plates and washers, thus far described, forms a well known type of rectifier stack.

Each rectifier plate, as is well known, may comprise a disc of metal 15 forming a base upon which is deposited a layer 16 of selenium, covered with a sprayed-on coating 17 of counter-electrode material which may be an alloy of cadmium. It is the contact between this counter-electrode coating and the surface of the spacing washer 3 which is disturbed by any relative movement between the two.

Figure 2:
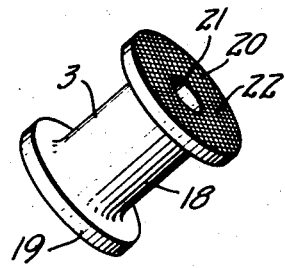
Fig. 2 is a perspective view of a spacing contact washer used in the stack of Fig. 1.

Fig. 2 shows a preferred form of spacing contact washer more in detail. This washer is made in the shape of a spool with a central cylindrical portion 18 and flanges 19 and 20 having a greater diameter than the central portion 18. The hole 21 through the washer is large enough to fit snugly over the insulating sleeve 4 which separates the washer from the stud 2.

Figure 3:
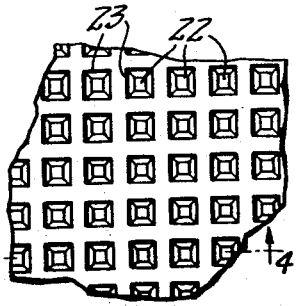
Fig. 3 is an enlarged plan view of a portion of the surface of the washer shown in Fig. 2.

Washer 3 may be made of any suitable material, as, for instance, aluminum, and at least one surface thereof is provided with a plurality of discontinuities which in this embodiment, as shown in Fig. 3, are in the form of depressions 22 which have the configuration of pyramidal frustrums which are arranged in close proximity to give the surface a waffle-like appearance. These depressions provide rather sharp edges 23, which are, for the most part, at an angle to circles drawn concentric-alloy with the center of the washer. The depressions in the surface of the washer may be made by etching, coining, or stamping, and it is necessary to have the depressions in only that surface of the washer which comes in contact with the counter-electrode material on the rectifier plate. However, I prefer to provide both end surfaces of the washers with the depressions to facilitate assembly of the rectifier stack, since the assembler can then place the washer on the spindle with either end in contact with the rectifier plate.

Figure 4:
Fig. 4 is an enlarged sectional view of the surface taken on the line 4—4 of Fig. 3.

In Fig. 4 an enlarged section through the recess 22 is shown, illustrating the pyramidal configurations. In one arrangement of these pyramidal depressions which gave excellent results the depressions were arranged in rows and spaced at centers .02 of an inch apart, while the depth of the depressions was from .002 to .004 of an inch and the distance between adjacent edges 23 was from .007 to .010 of an inch.

While the pyramidal structure is preferred, other configurations providing edges which are at an angle to possible paths of relative movement between the washer and adjacent rectifier plate may be used.

When the rectifier stack is assembled, the nut 13 is first screwed on to one end of the stud 2, whereupon the insulating washer 11 may be slipped over the stud against the nut. Then the insulating sleeve 4 is slipped over the stud followed by the metal washer 9 and the metal connecting lug 7. The metal washer 5 is then slipped over the sleeve 4, followed alternately by the rectifier plates interspersed by the spacing washers 3. The rectifier plates are thus assembled with their counter-electrode surfaces facing in the same direction.

The metal washer 5 may have a surface treated in the same manner as the surfaces of the spacing washer 3, and the counter-electrode surface of the first rectifier plate is placed in contact with the treated surace of this washer.

The counter-electrode surface of each sectifier plate will then be in contact with the treated surface of its adjacent spacing washer and the base plate of the next adjacent plate with its opposite surface. The other end of the stack may be completed in the same manner with the metal washer 6 and connecting terminal 8 followed by the metal washer 10 placed over the stud. Insulating washer 12 is then placed over the washer 10 and the nut 14 screwed into position.

When the nuts are tightened a predetermined amount, pressure is exerted longitudinally of the stack with the result that the softer counter-electrode material on the surface of the rectifying plates is caused to cold-flow into the depressions or notches in the spacing washers, thus locking the two surfaces together and preventing any relative movement between the rectifier plates and the washers. Thus, a ridged construction is provided which cannot slip when the units are tightened and the electrical characteristics of the stack will therefore not be impaired. At the same time good electrical connection is assured.

In comparison tests made using washers of the present invention as against the washers previously used which had plain surfaces, the number of rejects was reduced from 32% for the previously used washers to zero for those of the invention. On life test, which is normally 1000 hours at 50° C., half of the rectifier stacks made in accordance with the invention operated for 2,160 hours at 75° C., while the other half operated for 4,258 hours at 75° C. A life of 1000 hours of 50° C. is considered good for this type of rectifier stack.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A rectifier stack comprising a plurality of rectifier plates, a supporting stud for said plates, means for mounting said plates in stacked relation on said stud, each of said plates having a coating of counter-electrode material, a spacing washer between each two adjacent rectifier plates, the surface of said washer which is in contact with a coating of counter-electrode material having a plurality of discontinuities therein between the center and the circumference thereof, said discontinuities forming edges on said surface which are at an angle to the paths of possible relative movement between said washers and plates, whereby, when said plates and washers are compressed together, the counter-electrode material on the plates will flow over the edges formed in the surfaces of the washers to lock the plates and washers against said relative movement.

2. A rectifier stack, as defined in claim 1, in which the discontinuities in the surface of each spacing washer are symmetrically positioned with respect to the axis of said washer.

3. A rectifier stack, as defined in claim 1, in which the discontinuities in the surface of each spacing washer are formed by depressions in said surface.

4. A rectifier stack, as defined in claim 3, in which the depressions in the surface of each spacing washer are frustrums of pyramids.

References Cited in the file of this patent
UNITED STATES PATENTS

| | | |
|---|---|---|
| 1,622,581 | Gunkel | Mar. 29, 1927 |
| 2,083,647 | Gilson | June 15, 1937 |
| 2,271,732 | Chappius | Feb. 3, 1942 |
| 2,752,542 | Nitsche | June 26, 1956 |
| 2,772,596 | Trussell | Dec. 4, 1956 |